United States Patent
Shea et al.

(10) Patent No.: US 8,990,266 B2
(45) Date of Patent: Mar. 24, 2015

(54) DYNAMIC DATA TRANSFORMATIONS FOR NETWORK TRANSMISSIONS

(71) Applicant: CipherPoint Software, Inc., Round Rock, TX (US)

(72) Inventors: Woody Shea, Round Rock, TX (US); Michael Fleck, Virginia Beach, VA (US)

(73) Assignee: CipherPoint Software, Inc., Round Rock, TX (US)

( * ) Notice: Subject to any disclaimer, the term of this patent is extended or adjusted under 35 U.S.C. 154(b) by 114 days.

(21) Appl. No.: 13/653,873

(22) Filed: Oct. 17, 2012

(65) Prior Publication Data

US 2013/0097129 A1   Apr. 18, 2013

Related U.S. Application Data

(60) Provisional application No. 61/548,564, filed on Oct. 18, 2011.

(51) Int. Cl.
   *G06F 17/30* (2006.01)

(52) U.S. Cl.
   CPC ............................... *G06F 17/30893* (2013.01)
   USPC ......................................................... 707/803

(58) Field of Classification Search
   CPC ............................... G06F 21/64; G06F 21/645
   USPC ............ 707/694, 697; 726/22, 23; 729/22, 23
   See application file for complete search history.

(56) References Cited

U.S. PATENT DOCUMENTS

| | | |
|---|---|---|
| 4,123,747 A | 10/1978 | Lancto et al. |
| 4,578,530 A | 3/1986 | Zeidler |
| 5,109,413 A | 4/1992 | Comerford et al. |
| 5,222,137 A | 6/1993 | Barrett et al. |
| 5,751,813 A | 5/1998 | Dorenbos |
| 5,784,461 A | 7/1998 | Shaffer et al. |
| 6,700,964 B2 | 3/2004 | Schmid et al. |
| 7,333,616 B1 | 2/2008 | Brettle et al. |
| 7,660,959 B2 | 2/2010 | Asher et al. |
| 7,743,403 B2 | 6/2010 | McCarty |
| 7,743,420 B2 | 6/2010 | Shulman et al. |
| 7,752,455 B2 | 7/2010 | Maheshwari et al. |
| 7,796,760 B2 | 9/2010 | Brettle et al. |
| 7,900,239 B2 | 3/2011 | Van Someren |
| 7,934,247 B2 | 4/2011 | Greco et al. |
| 7,945,519 B2 | 5/2011 | Malcolm |
| 7,995,758 B1 | 8/2011 | Shapiro |
| 8,234,640 B1 * | 7/2012 | Fitzgerald et al. ................ 718/1 |

(Continued)

*Primary Examiner* — Baoquoc N To

(74) *Attorney, Agent, or Firm* — Kilpatrick Townsend & Stockton LLP

(57) ABSTRACT

A method of dynamically performing data transformations on information that is transmitted between a user device and a web service may include receiving interface code from the web service, receiving an input from the user device that identifies a data type, and a data transformation to be applied to data instances matching the data type. The method may also include causing a definition file to be stored with the data type, the data transformation, and a resource locator. The method may additionally include, in a second communication session, intercepting a transmission, accessing the definition file using the resource locator, determining whether the data instance matches the data type, causing the data transformation to be performed on the data instance to generate transformed data, and inserting the transformed data into the transmission if the data instance matches the data type.

20 Claims, 10 Drawing Sheets

(56) References Cited

U.S. PATENT DOCUMENTS

| | | |
|---|---|---|
| 8,370,648 B1 | 2/2013 | Natanzon |
| 8,612,971 B1 * | 12/2013 | Fitzgerald et al. ................ 718/1 |
| 8,631,460 B2 | 1/2014 | Shea et al. |
| 2004/0125402 A1 | 7/2004 | Kanai et al. |
| 2004/0230792 A1 | 11/2004 | McCarty |
| 2004/0250082 A1 | 12/2004 | Li et al. |
| 2005/0005112 A1 | 1/2005 | Someren |
| 2006/0005017 A1 | 1/2006 | Black et al. |
| 2006/0075228 A1 | 4/2006 | Black et al. |
| 2008/0066144 A1 | 3/2008 | Greco et al. |
| 2008/0080715 A1 | 4/2008 | Lee et al. |
| 2008/0134175 A1 * | 6/2008 | Fitzgerald et al. ................ 718/1 |
| 2008/0134176 A1 * | 6/2008 | Fitzgerald et al. ................ 718/1 |
| 2008/0134178 A1 * | 6/2008 | Fitzgerald et al. ................ 718/1 |
| 2008/0212782 A1 | 9/2008 | Brettle et al. |
| 2008/0235759 A1 | 9/2008 | McCarty |
| 2009/0028336 A1 | 1/2009 | Goodman et al. |
| 2009/0028339 A1 | 1/2009 | Goodman et al. |
| 2009/0092252 A1 | 4/2009 | Noll et al. |
| 2009/0119743 A1 | 5/2009 | Werner et al. |
| 2009/0185223 A1 | 7/2009 | Kanai et al. |
| 2009/0235303 A1 | 9/2009 | Yamaoka et al. |
| 2010/0146582 A1 | 6/2010 | Jaber et al. |
| 2010/0158253 A1 | 6/2010 | Challener |
| 2010/0199088 A1 | 8/2010 | Nath et al. |
| 2010/0235649 A1 | 9/2010 | Jeffries et al. |
| 2011/0093721 A1 | 4/2011 | Perlman |
| 2011/0145560 A1 | 6/2011 | Moon et al. |
| 2011/0167102 A1 | 7/2011 | Matzkel et al. |
| 2011/0173438 A1 | 7/2011 | Matzkel |
| 2011/0178933 A1 | 7/2011 | Bailey et al. |
| 2011/0314088 A1 | 12/2011 | Matzkel et al. |
| 2012/0036370 A1 | 2/2012 | Lim et al. |
| 2012/0079266 A1 | 3/2012 | Ogata et al. |
| 2012/0131354 A1 | 5/2012 | French |
| 2012/0166793 A1 | 6/2012 | Kim |
| 2012/0204032 A1 | 8/2012 | Wilkins et al. |
| 2012/0239944 A1 | 9/2012 | Goodman et al. |
| 2012/0291030 A1 * | 11/2012 | Fitzgerald et al. ................ 718/1 |
| 2012/0314854 A1 | 12/2012 | Waters |
| 2012/0323717 A1 | 12/2012 | Kirsch |
| 2012/0324242 A1 | 12/2012 | Kirsch |
| 2012/0331284 A1 | 12/2012 | Kouladjie et al. |
| 2013/0067012 A1 | 3/2013 | Matzkel et al. |
| 2013/0067217 A1 | 3/2013 | Matzkel et al. |
| 2013/0097129 A1 * | 4/2013 | Shea et al. .................... 707/693 |
| 2013/0247045 A1 * | 9/2013 | Fitzgerald et al. ................ 718/1 |

* cited by examiner

US 8,990,266 B2

DYNAMIC DATA TRANSFORMATIONS FOR NETWORK TRANSMISSIONS

CROSS-REFERENCES TO RELATED APPLICATIONS

This application is a nonprovisional of, and claims the benefit to U.S. Provisional Patent Application No. 61/548,564, filed on Oct. 18, 2011, the entire contents of which are incorporated herein.

BACKGROUND

A web service is a method of communication between two electronic devices over a network. Web services may include a software system designed to support interoperable machine-to-machine interaction over a network using an interface described in a machine-processable format. Web services are commonly used by groups of people, systems, and individuals needing access to documents, files, and data. These web services can involve content management and document management systems. Web services are widely varied, and allow for management and provisioning of intranet portals, extranets, websites, document and file management, collaboration spaces, social tools, enterprise search, business intelligence, process integration, system integration, workflow automation, and core infrastructures for business solutions. Web services can also provide financial data, data processing, data storage, and/or the like.

Because web services usually use an interface to describe a communication format, individuals and/or computer systems that interface with web services may need to tailor client-side software according to the interface. However, problems may arise when server-side web services change their interface. During subsequent communication sessions, the client-side software may no longer work with the new interface. The client-side software may need to be redesigned to interact with the new interface, which can cost a prohibitive amount of time, resources, and money.

BRIEF SUMMARY

In one embodiment, a method of dynamically performing data transformations on information that is transmitted between a user device and a web service may be presented. The method may include, during a first communication session, receiving interface code from the web service, and receiving one or more inputs from the user device. In one embodiment, the one or more inputs may identify a data type that is associated with the interface code and a data transformation to be applied to data instances matching the data type. The method may also include causing a definition file to be stored. The definition file may include the data type, an indication of the data transformation, and a resource locator that is associated with the web service. During a second communication session, the method may further include intercepting a transmission between the user device and the web service. The transmission may include a data instance and the resource locator. The method may also include accessing the definition file using the resource locator, determining whether the data instance matches the data type, causing the data transformation to be performed on the data instance to generate transformed data if the data instance matches the data type, and inserting the transformed data into the transmission if the data instance matches the data type.

In one embodiment, the method may also include allowing the transmission to pass between the user device and the web service without transforming the data instance if the data instance does not match the data type. In various embodiments, the data transformation may include encrypting or decrypting the data instance, compressing or decompressing the data instance, or language translation. In another embodiment, the data type comprises a field in a structured data set. In this embodiment, the method may additionally include determining that the field should have a format preserved, generating a placeholder, inserting the placeholder into the transmission place of the field, performing the data transformation on the field to generate a transformed field, and inserting the transformed field into the data stream as an attachment, whereby the attachment is referenced by the placeholder.

The data type may indicate segments of unstructured data. The data instance may comprise a data file comprising unstructured data. Causing the data transformation to be performed on the data instance may include causing the data file to be transformed. The resource locator may comprise a Uniform Resource Locator (URL). The definition file may comprise an XML Definition File (XDF). The data type may comprise an input control.

In another embodiment, a computer-readable memory may be presented. The computer-readable medium may have stored thereon a sequence of instructions which, when executed by one or more processors, causes the one or more processors to perform data transformations on information that is transmitted between a user device and a web service by, during a first communication session, receiving interface code from the web service, and receiving one or more inputs from the user device. The one or more inputs may identify a data type that is associated with the interface code and a data transformation to be applied to data instances matching the data type. The sequence of instruction may also cause the one or more processors to operate by causing a definition file to be stored. The definition file may include the data type, an indication of the data transformation, and a resource locator that is associated with the web service. During a second communication session, the sequence of instruction may additionally cause the one or more processors to operate by intercepting a transmission between the user device and the web service. The transmission may include a data instance and the resource locator. The sequence of instruction may further cause the one or more processors to operate by accessing the definition file using the resource locator, determining whether the data instance matches the data type, causing the data transformation to be performed on the data instance to generate transformed data if the data instance matches the data type, and inserting the transformed data into the transmission if the data instance matches the data type.

In yet another embodiment, a system may be presented. The system may include one or more processors and a memory communicatively coupled with and readable by the one or more processors. The memory may have stored therein a sequence of instructions which, when executed by the one or more processors, cause the one or more processors to perform data transformations on information that is transmitted between a user device and a web service by, during a first communication session, receiving interface code from the web service, and receiving one or more inputs from the user device. The one or more inputs may identify a data type that is associated with the interface code and a data transformation to be applied to data instances matching the data type. The sequence of instruction may also cause the one or more processors to operate by causing a definition file to be stored. The definition file may include the data type, an indication of the data transformation, and a resource locator that is associated with the web service. During a second communication session, the sequence of instruction may additionally cause the one or more processors to operate by intercepting a transmission between the user device and the web service. The transmission may include a data instance and the resource locator. The sequence of instruction may further cause the one or more processors to operate by accessing the definition file using the resource locator, determining whether the data instance matches the data type, causing the data transformation to be performed on the data instance to generate transformed data if the data instance matches the data type, and inserting the transformed data into the transmission if the data instance matches the data type.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
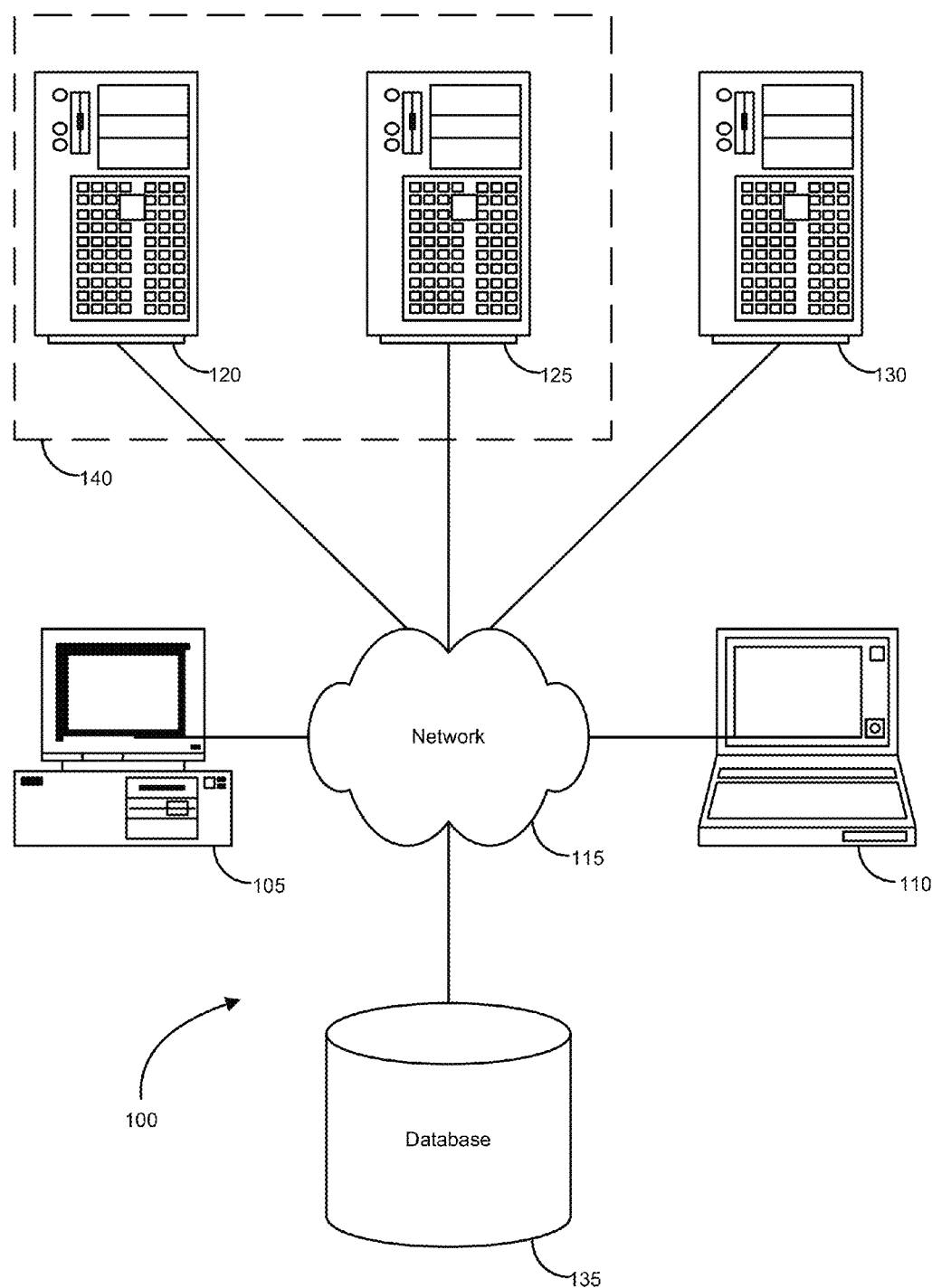
FIG. 1 illustrates a block diagram of components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Described herein, are embodiments for interfacing with any web service. A standard Application Programming Interface (API) may be used on a client for end-users to quickly and easily define the key elements in the interface of a given web service at the other end, for the purpose of allowing a software application to quickly adapt and interact with any web service. In one embodiment, key elements may be identified in the web interface that the end-user may deem as important for the nature of the application supported by this invention. These key elements may be stored in a definition file and associated with a data transform to be applied when interfacing with the web service. In subsequent communication sessions, data transferred back and forth between a user device and the web service may be analyzed and possibly transformed according to the definition file. The embodiments described herein can analyze data as it is transmitted, match data instances with the data types specified within the definition file, and apply the specified data transform. These embodiments may have a wide range of applicability and may be used to encrypt/decrypt data, compress/decompress data, specify upload locations, translate languages, and/or the like.

Every web service provides its own, unique interface for interacting with the web service. Typically, users need to reverse engineer the interface at a programming level in order to interact with the web service. Using traditional methods for programmatically interacting with web services, a new update must be developed and sent to every end-user for each new service to be supported. In contrast, the embodiments herein allow the end-user to define the interactions themselves, thus greatly reducing the wait time for a supported web service, and possibly allowing applications that use this invention to support nearly any web service available.

Existing technology relies on a team of developers to programmatically define how their application will interact with every supported web service. If a supported web service's interface changes, the programming code must be changed to support the interface changes. An update must be sent to all existing customers, so that they may successfully interact with the supported web services. Embodiments described herein allow the end-user to generate the definitions required for interacting with the web service. Therefore, if the web service interface changes, a notification is sent to the end-user, and the end-user can re-create the definition immediately, thus reducing downtime.

Because they rely on the end-user to define the web service interface, embodiments described herein also allow applications to support proprietary (or homegrown) web services. Also supported are less popular services which would usually be over looked by companies supporting web service interaction in the traditional manner. These embodiments give the end-user a powerful tool for quickly gaining support for nearly all of the web services that are important to them, instead of relying on the software provider to write the code for them. Additionally, end-users can quickly adapt to changing interfaces without having to rely on the application development team to rewrite the application and send out an update.

In one embodiment, a graphical user interface (GUI) may be provided that allows non-technical end-users to generate a definition file for interacting programmatically with a web service. Once the definition file is created, this embodiment may use the definition file with the specified web service and provide a standard API for interacting with the data being uploaded and/or downloaded to/from the web service. The standard API may act as a proxy and may include data transformation modules that are specific to the software application.

Generally, each embodiment described herein may be implemented using a computer system. Instructions may be stored in a memory that direct one or more processors to operate such that the methods described herein can be carried out. Additionally, these embodiments may also be implemented in a dedicated hardware system. This hardware system may include modules of hardware and/or software that are specifically designed to carry out the various steps related to these embodiments. One having skill in the art will be able to implement all of the functionalities described herein using the technologies and architectures available in light of this disclosure.

FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java∩, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130.

Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10 g, that is adapted to store, update, and retrieve data in response to SQL-formatted commands.

Figure 2:
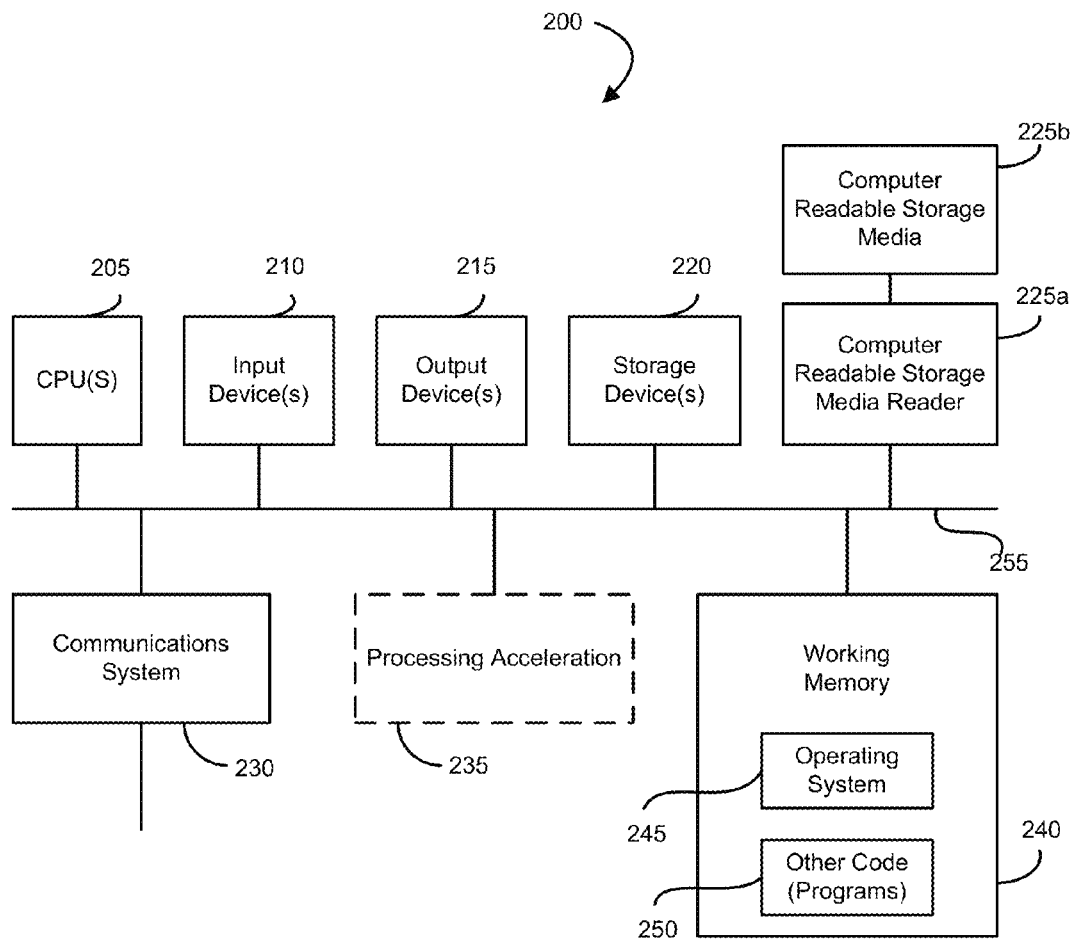
FIG. 2 illustrates a block diagram of an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

The following methods may be implemented by a computer system, such as computer system 200 in FIG. 2. Each step of these methods may be done automatically by the computer system, and/or may be provided as inputs and/or outputs to a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Therefore, it will be understood in light of this disclosure, that each step and each method described herein may be altered to include an input and output to and from a user, or may be done automatically by a computer system.

Figure 3:
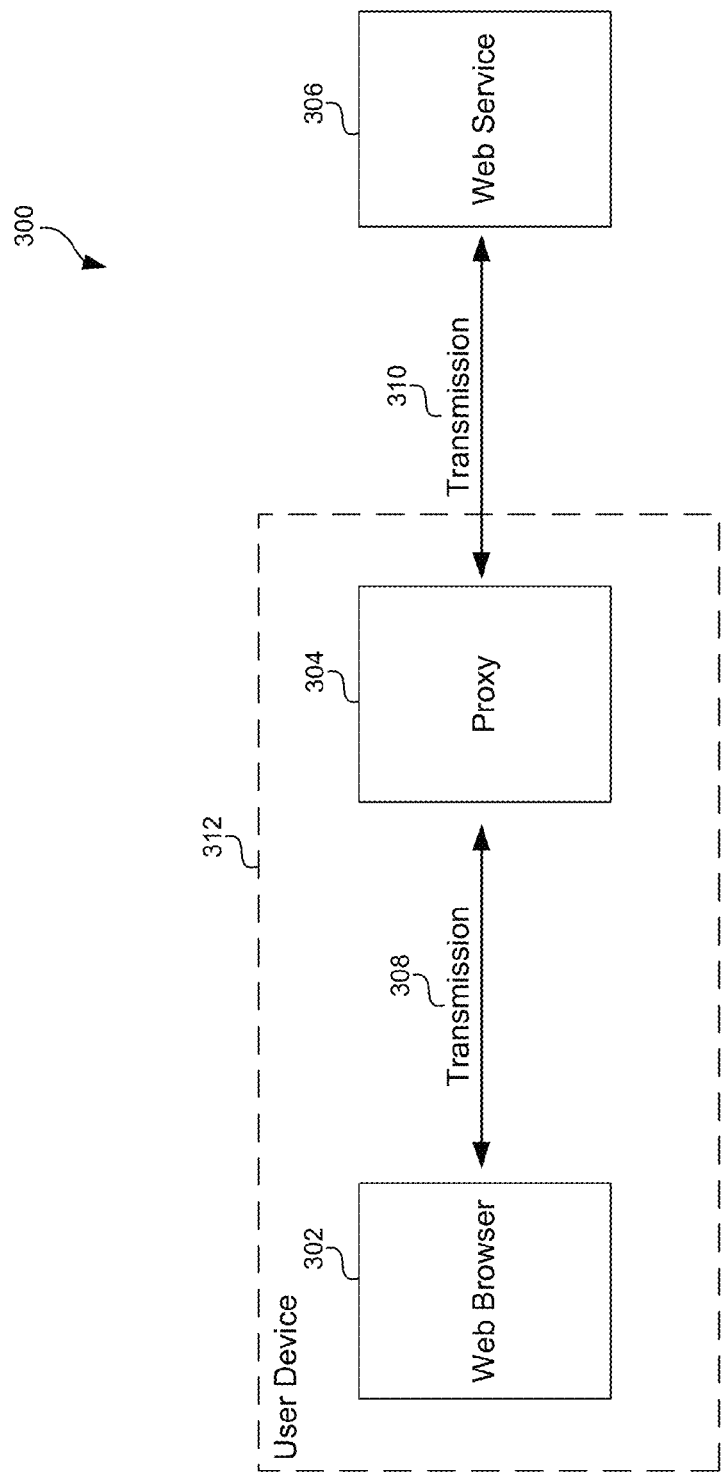
FIG. 3 illustrates a block diagram of a user device interacting with a web service, according to one embodiment.

FIG. 3 illustrates a block diagram 300 of a user device 312 interacting with a web service 306, according to one embodiment. It will be understood that this is a simplified block diagram where many of the details have been abstracted for brevity. In this particular embodiment, the user device 312 may comprise a personal computer, a thin client, a laptop computer, a workstation, a server, a notebook computer, a tablet computer, a smart phone, a PDA, and/or the like. At least two processes may operate on the user device 312, namely a web browser 302 and a proxy 304. The proxy 304 may also be referred to as the API in some embodiments.

Generally, the user device 312 will interact with the web service 306 using the web browser 302. For example, the web service 306 may comprise an online collaborative data repository, such as Microsoft SharePoint®. Before sending data to the web service 306 (or receiving data from the web service 306) a user may prefer that the data undergo some form of transformation before reaching its destination. For example, for an online collaborative data repository, a user may desire that the data be encrypted/decrypted as it is uploaded/downloaded in a transparent manner that does not require user approval/interaction for each transmission. The proxy 304 may operate as a plug-in to the web browser 302 to perform these functions.

In one embodiment, the proxy 304 may detect a transmission 308 emanating from the web browser 302. The transmission 308 may include data instances, such as fields, forms, and/or files that have been previously designated as data instances that should undergo a data transformation. After identifying these data instances, the proxy 304 may consult a definition file to match each data instance to a corresponding data transform. Transform modules within the proxy 304 may then transform the data and reinsert it into transmission 310 to be sent to the web server 306. This operation may be carried out without the knowledge of the web browser 302 or the web server 306.

For example, a user may designate certain fields within a web form as data types that should be encrypted before they are sent to the web service 306. The proxy 304 may store a definition file that specifies these data types, the associated web service 306, and the type of transformation to be performed (which in this case comprises encrypting the data types). As transmission 308 is received by the proxy 304, each data instance within the transmission 308 may be analyzed. When the previously specified fields are detected, the proxy 304 may intercept of these unencrypted fields from the transmission 308. The unencrypted fields may then be transformed using an encryption module and reinserted into transmission 310 before delivery to the web service 306. Thus, the web browser 302 may be sending and receiving unencrypted data, while the web server 306 is sending and receiving encrypted data.

Note that data encryption is merely an exemplary form of data transformation. Other embodiments may be used for data compression, language translation, programming language translation, data augmentation such as adding or appending additional data to each data field, removing certain data instances from a transmission, detecting and censoring specified phrases and/or the like. In short, any type of data transformation may be used by various embodiments described herein.

As used herein, the term "definition file" may be used to describe a memory-stored designation of the data types selected by a user or process for a particular web service, along with an indication of a data transformation to be used on each data type. In some embodiments, the definition file may be generated using a text editor by a user. In other embodiments, the definition file may be generated automatically by a software process. For example, the definition file may be generated by a software process configured to automatically detect sensitive data within the web form, such as passwords, personal information, credit card information, and/or the like.

Figure 4:
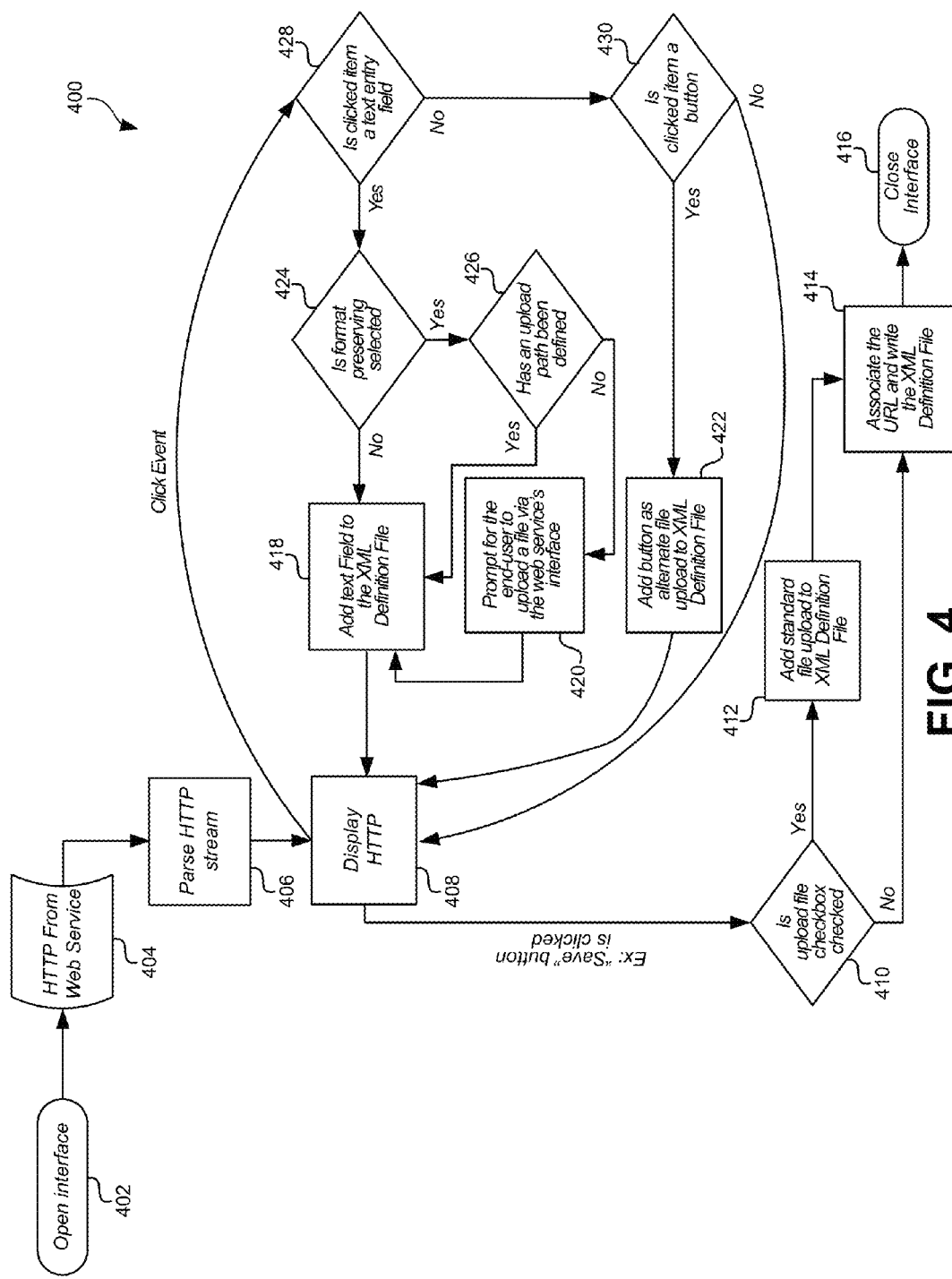
FIG. 4 illustrates a flowchart for creating a definition file, according to one embodiment.

In one exemplary embodiment, a GUI may be provided to a user and configured to display elements of the web interface, whereby the data types may be specified. FIG. 4 illustrates a flowchart 400 for creating a definition file, according to one embodiment. The GUI may be configured to first open the interface retrieved from the web service (402). For example, the GUI may be configured to receive an HTTP stream from the web service (404). Note that HTTP is merely exemplary, and any form of interface code may be used in its place. In other embodiments, an interface may be specified using WSDL, XML, XSLT, and/or any other descriptive language.

The GUI may also parse the interface code (406) and display the results for a user (408). In one embodiment, the display may resemble a web form and may be displayed in the GUI as it would be in a web browser. In another embodiment, the display may resemble a file tree for data files stored at the web service. This may be very similar to a standard web browser, except that the elements in the display may be unusable. At this point, a user may select various elements displayed by the GUI and associate a data transformation with each selected element. The selected elements can be added to the definition file along with the associated data transformation.

To select an element, a user may click on an element displayed by the GUI. Depending on the type of element selected, the GUI may take a number of different actions. First, it may be determined whether the clicked element is a text entry field (428). For example, a text entry field may be a part of a web form to be filled out by a user. If the element is a text entry field, and if a format preserving option is not selected (424), the text field may be added to a definition file (418). In one embodiment, the definition file may be stored in XML format. However, other embodiments may use other file formats.

In one embodiment, only a single data transform may be applicable for each element selected. In this case, the text entry field may be added to the definition file by itself. In another embodiment, the user may select between various data transforms that may be available for each element selected. For example, a user may choose to have data encrypted and/or compressed before it is uploaded to the web service. In this case, the text entry field may be stored in the definition file along with an indication of which data transform should be applied.

Some data transforms preserve the format of the text field after the data transformation. In the example of encryption, format preserving transforms preserve the format of the plaintext in the resulting encrypted text. This may include character representations, field lengths, and other field restrictions. If it is determined that a format preserving option is selected (424), it may next be determined whether an upload path has been defined (426). If no upload path is defined, the user may be prompted to provide an upload path, or to upload a file via the web service's interface (420).

The upload path may be used to preserve the format of the text field by encrypting the text field and including it as an attachment to the main upload file. The method may generate unique placeholders for each text field to be encrypted, inserting unique placeholders in the place of the text fields in the file, and encrypting the actual contents of the text fields using any encryption method. This embodiment may offer the advantage of not requiring the use of unreliable format-preserving encryption techniques in order to maintain the format of the form itself. The unique placeholders can be configured to preserve any necessary format for the form.

After a first selection has been completed, the user may continue selecting other interface elements as needed (408). For example, if the user clicks on an element that is not a text entry field (428), it may then be determined whether the element is a control element (430). In one embodiment, control elements may include buttons, sliders, radio buttons, and/or the like. Merely by way of example, FIG. 4 illustrates a button selection. When a control element is selected, it may be added to the definition file (422). In one embodiment, a button may be used to commence an upload or download of data. The definition file can store an indication of the button, and when clicked, can execute the specified data transforms on each data instance identified by the definition file.

After a user has finished selecting interface elements to include in the definition file, the user may choose to save the definition file and exit the GUI. In one embodiment, a determination may be made as to whether an upload file option is checked (410). This option may instruct the GUI to process the data on any attachments that are transferred to/from the web service being defined. If the upload file option is selected, the GUI can add this option to the definition file, such that it can be exercised each time the definition file is used in a data transfer (412). In either case, a resource locator for the web service can be stored along with the definition file (414). In one embodiment, each web service may have its own definition file. In this case, the name of the definition file may indicate the web service for which it is associated. In another embodiment, a single definition file may include selections for a number of different web services. In this case, the resource locator may be appended to each selection, or to a group of selections indicating the web service for which it/they should be associated. The resource locator may comprise any indication of a location of the web service. In many cases, the resource locator may include a Uniform Resource Locator (URL). After the definition file is saved, the GUI may be closed (416).

Figure 5:
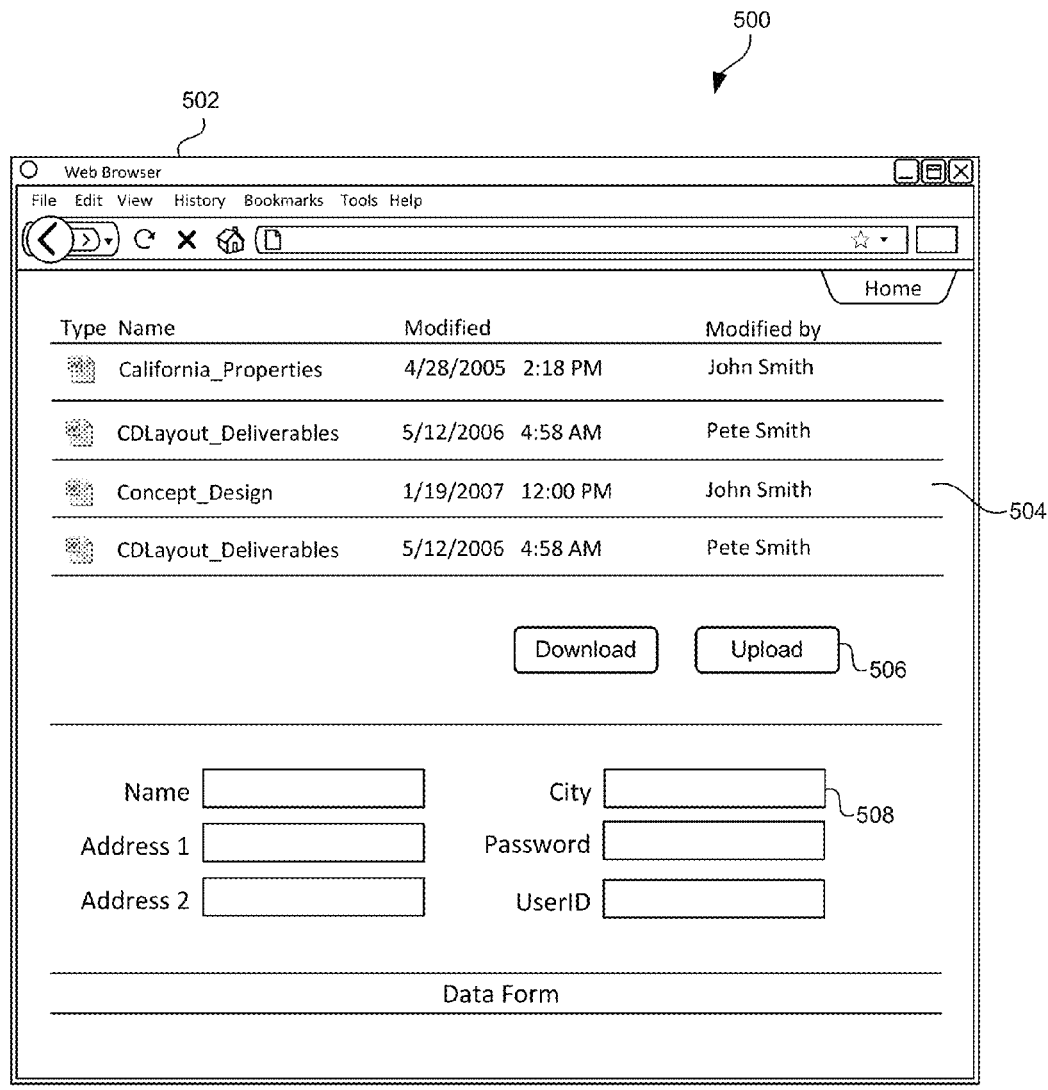
FIG. 5 illustrates a user interface for creating a definition file, according to one embodiment.

FIG. 5 illustrates a user interface 500 for creating a definition file, according to one embodiment. It will be understood that this example is merely for purposes of illustration, and one having skill in the art would understand that different arrangements and interface styles may be used in conjunction with the embodiments described herein. Here, the GUI may operate in a web browser 502, or in another interface that re-creates what would be seen in a web browser. The user may select various data types from the GUI that should be stored in the definition file. For example, a portion of the GUI may display a form that includes text entry fields. A user may select one or more of the text entry fields, such as field 508, indicating that text entered into the selected field should be subject to a specified data transform. For example, a user may wish any text entered into field 508 to be encrypted before it is sent to the web service. The definition file may therefore save an indication of field 508, such as an HTML tag or button label, to the definition file. Later, when the user device accesses the web service during subsequent communication sessions, any text entered into field 508 may be encrypted as specified in the definition file.

Additionally or alternatively, the GUI may also display other types of information, such as the contents of a directory listing a plurality of files 504. In conjunction, the GUI may also display controls 506 used to upload and download data. As with text fields, a user may select various directories, files, file types, file locations, and/or the like, to undergo data transforms. The data transforms may be executed when the user selects one or more of the controls 506. Indications of the file types and/or controls may be stored in the definition file.

As used herein, the term "data type" may be used to refer to text fields, data files, interface controls, and/or the like. The definition file may store data types that can later be matched to data instances. For example, a data type may include a particular text field in a web form identified by a field name, and the data instance may be text entered into that text field by a user during a communication session with the web service. Similarly, a data type may be an event associated with clicking on a control, and the data instance may be a user clicking on that control during the communication session with the web service.

Figure 6:
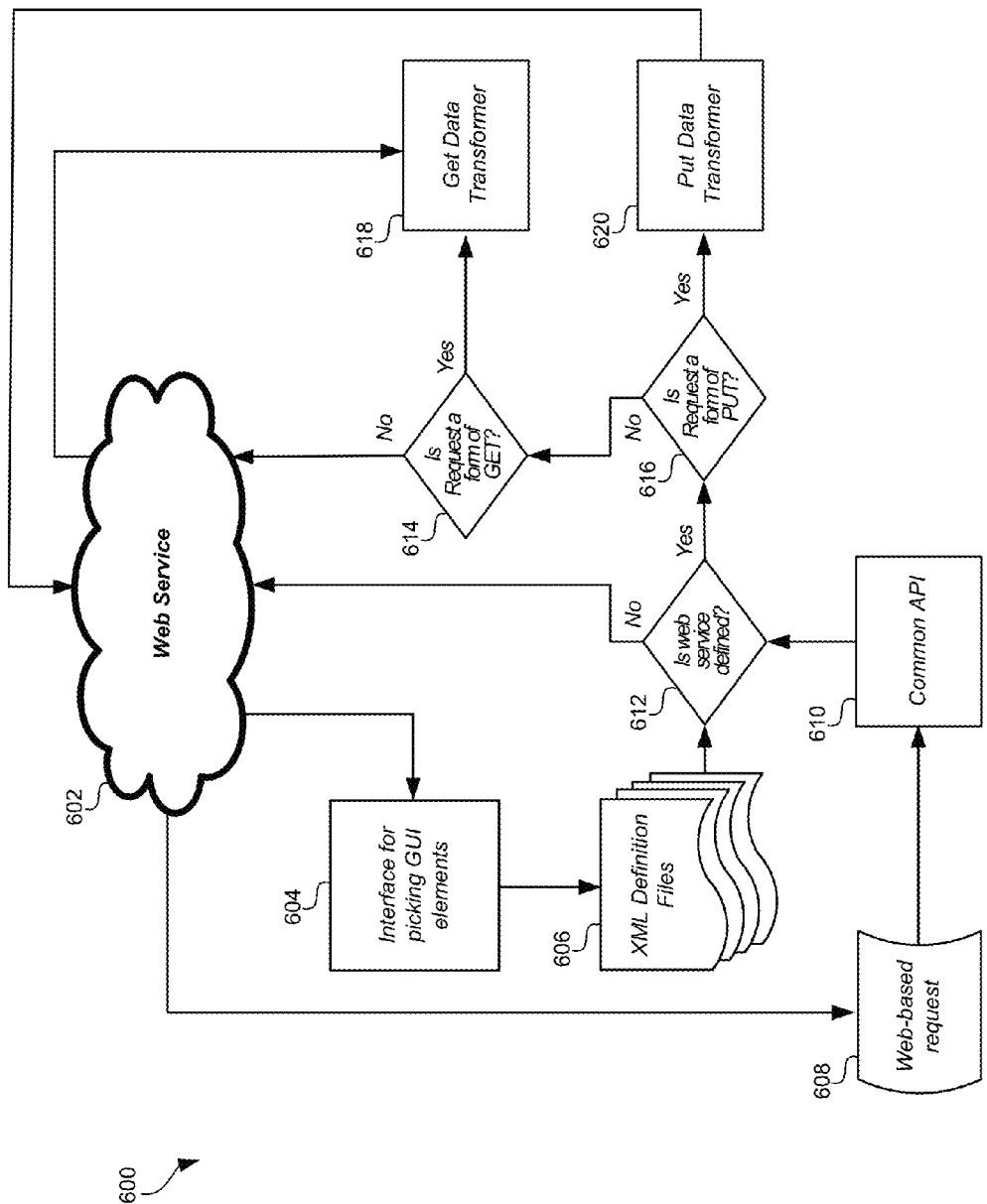
FIG. 6 illustrates a flowchart for performing data transformations, according to one embodiment.

FIG. 6 illustrates a flowchart 600 for performing data transformations, according to one embodiment. Flowchart 600 describes the operation of the proxy as it intercepts data transferred between the user device and the web service. According to one embodiment, some of the operations depicted by flowchart 600 may take place during a communication session subsequent to the communication session of flowchart 400 of FIG. 4. The first communication session may include providing the interface for picking GUI elements (604) and creating one or more definition files (606). The second communication session may include an interaction between a user device and the web service during which the definition files are referenced and used to carry out the specified data transformations.

During the second communication session, a web-based request may be passed between the web service and the user device (608). The web-based request may be intercepted by the proxy, or common API (610). The proxy may then access the definition files to determine whether any of the definition files are associated with the particular web service 602 (612). If the web service is not referenced by the definition files, then the proxy 610 may simply forward the intercepted data to the web server 602 without performing any data transforms. The fact that the data transmission was intercepted in the first place need not be transparent to the user device and the web service 602.

On the other hand, if the proxy determines that the web server 602 is specified in one or more of the definition files, a data transformation may be carried out as specified by the definition files. If the web-based request is in the form of a PUT (616), then a PUT data transformer may be applied to each selected data element (620). Alternatively, if the web-based request is in the form of a GET (614), then a GET data transformer may be applied to the selected data elements (618). The GET data transformer 618 and the PUT data transformer 620 will be discussed in greater detail further herein below.

The web-based request may include multiple data instances that can be matched to a single data type. For example, a data type in the definition files may specify all Microsoft Word® documents should be compressed using a compression algorithm by the PUT data transformer. The web-based request may include a plurality of Microsoft Word® documents, each of which should be compressed before being sent to the web service 602. Similarly, a single data instance in the web-based request may be associated with multiple data types in the definition file. For example, the definition file may specify that all password fields should be encrypted. The definition file may also specify that all text fields should be compressed. In this case, a password entered into a text field could have both the compression data transformer and the encryption data transformer applied. It will be understood, that a web-based request may include numerous data instances that can be matched to numerous data types in the definition files. Although not shown in flowchart 600, each data instance of the web-based request can be parsed through and sequentially matched to data types in the definition files.

Figure 7:
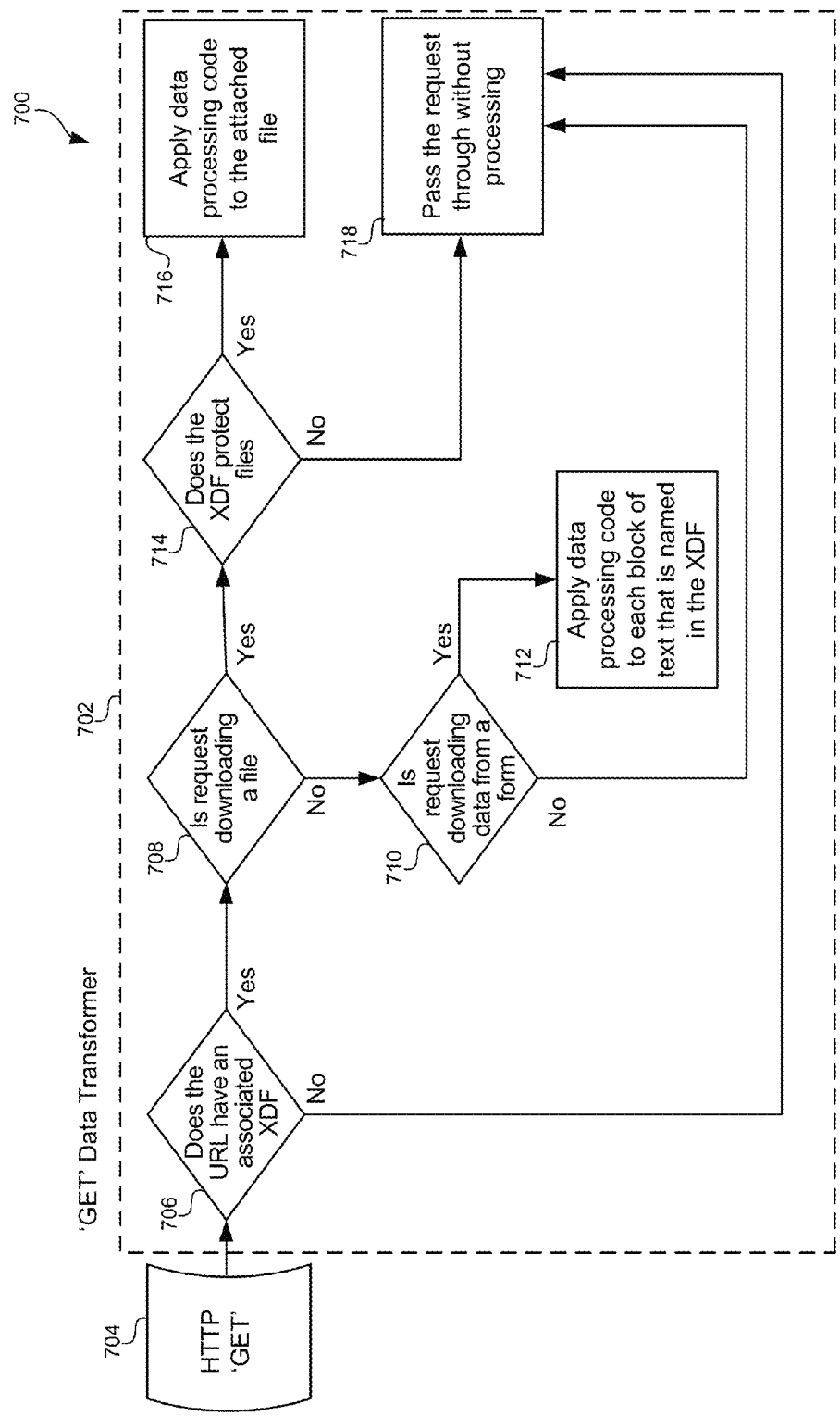
FIG. 7 illustrates a flowchart for receiving data from a web service, according to one embodiment.

FIG. 7 illustrates a flowchart 700 for receiving data from a web service, according to one embodiment. The operations described here may be carried out by a GET data transformer 702 as previously referenced in relation to FIG. 6. In this particular embodiment, the GET request may be an HTTP GET command to retrieve information from the web service (704). First, it may be determined whether the resource locator of the web service is referenced by one or more of the definition files. In this embodiment, the resource locator may comprise a URL and the definition files may be XML Definition Files (XDFs). For example, the proxy may search the XDFs looking for entries associated with the URL from the current HTTP request. If one is found, then the proxy may continue processing the request.

If the resource locator is referenced by one or more of the definition files, a determination may be made as to whether the request is downloading a form or a file (708). If a form is being downloaded (710) then the specified data transformation may be applied to each block of text that is named in the definition file (712). In one embodiment, the data transformation module performing the data transformation may be a library compiled by the application developers using this embodiment. Generally, this code may receive a collection of strings. Each string may be text associated with a text field which has been flagged for data transformation by the definition file. The first element in the collection may contain a list of any elements which require format preservation, along with placeholders which were used in their place and inserted into the file. This module may return a collection of transformed data strings processed in any order. For encryption, this could be used for protecting data at rest in a cloud service. This module could attain an appropriate encryption key, then decrypt the strings, and build a new collection, while maintaining the index positions in the cloud service. The placeholder values for format preserving data can be replaced with the appropriate values from the string in the first position of the collection which is passed to this library.

Alternatively, if a file is being downloaded (714), the data transformation may be applied to the entire file (716). As in the case for downloading forms, this may use a library compiled by the application developers using this embodiment. This code may take a data stream associated with the downloaded file and return a data stream with file data processed according to the transformation. For example, if this is protecting data at rest in a cloud service through encryption, this code could attain an appropriate encryption key, then decrypt the data, and return the clear text in a data stream. A similar operation may be carried out for data compression, language translation, and so forth.

In cases where a particular web service is not associated with any reference in the definition files, or in cases where an unrecognized file format is used, the GET data transformer 702 may simply pass the request from the web service to the user device. That the GET data transformer was involved at all in the process may be transparent to both the user device and the web service.

Figure 8:
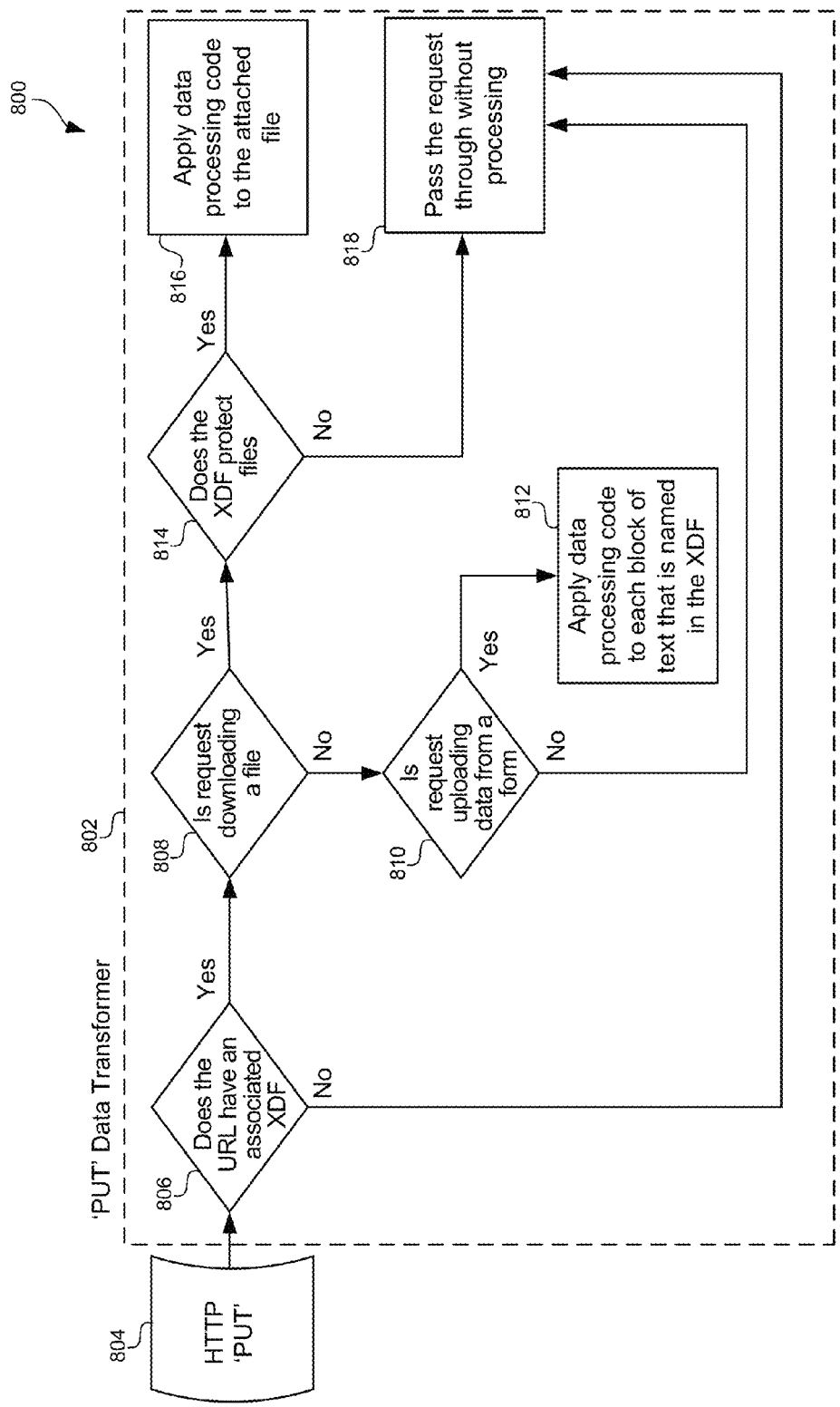
FIG. 8 illustrates a flowchart for sending data to a web service, according to one embodiment.

FIG. 8 illustrates a flowchart 800 for sending data to a web service, according to one embodiment. Flowchart 800 is similar to flowchart 700, except that an HTTP PUT request is used to transfer data from the user device to the web service (804). If the resource locator for the web service is not referenced by the definition files, or if the file type is not recognized by the PUT data transformer 802, then the PUT data transformer 802 may pass the request through without processing (818). Again, that the PUT data transformer 802 was involved at all in this process may be transparent to both the user device and the web service.

If it is determined that a file is being uploaded (808), and it is determined that the definition files specify that files should be subject to data transforms (814), then a transformation module may apply the specified data transforms. For example, this code could take a data stream associated with the uploaded file and return a transformed data stream. In the example of protecting data at rest in a cloud service through encryption, this code could attain an appropriate encryption key, encrypt the data, and return the encrypted data in the data stream for the web service.

Alternatively, if it is determined that a data form is being uploaded (810), then the PUT data transformer 802 may apply the data transformation code to each block of text that is specified by the definition file (812). For example, for protecting data at rest in a cloud service through encryption, this code could attain an appropriate encryption key, then encrypt the strings and build a new collection while maintaining the index positions. The new collection of strings could be returned, where the first element in the collection can be a concatenated string of all of the fields which require format preservation, along with the placeholders generated. The generated placeholders could be inserted at the appropriate positions for each field in the form.

Flowchart 800 is specific to the situation where data is being transferred from the user device to the web service. As used herein, when reference is made to transmitting data between the web service and the user device, this should be understood as a generic term covering both uploads and downloads. In other words, when transmitting data between two devices, either device may be receiving and/or sending data.

Figure 9:
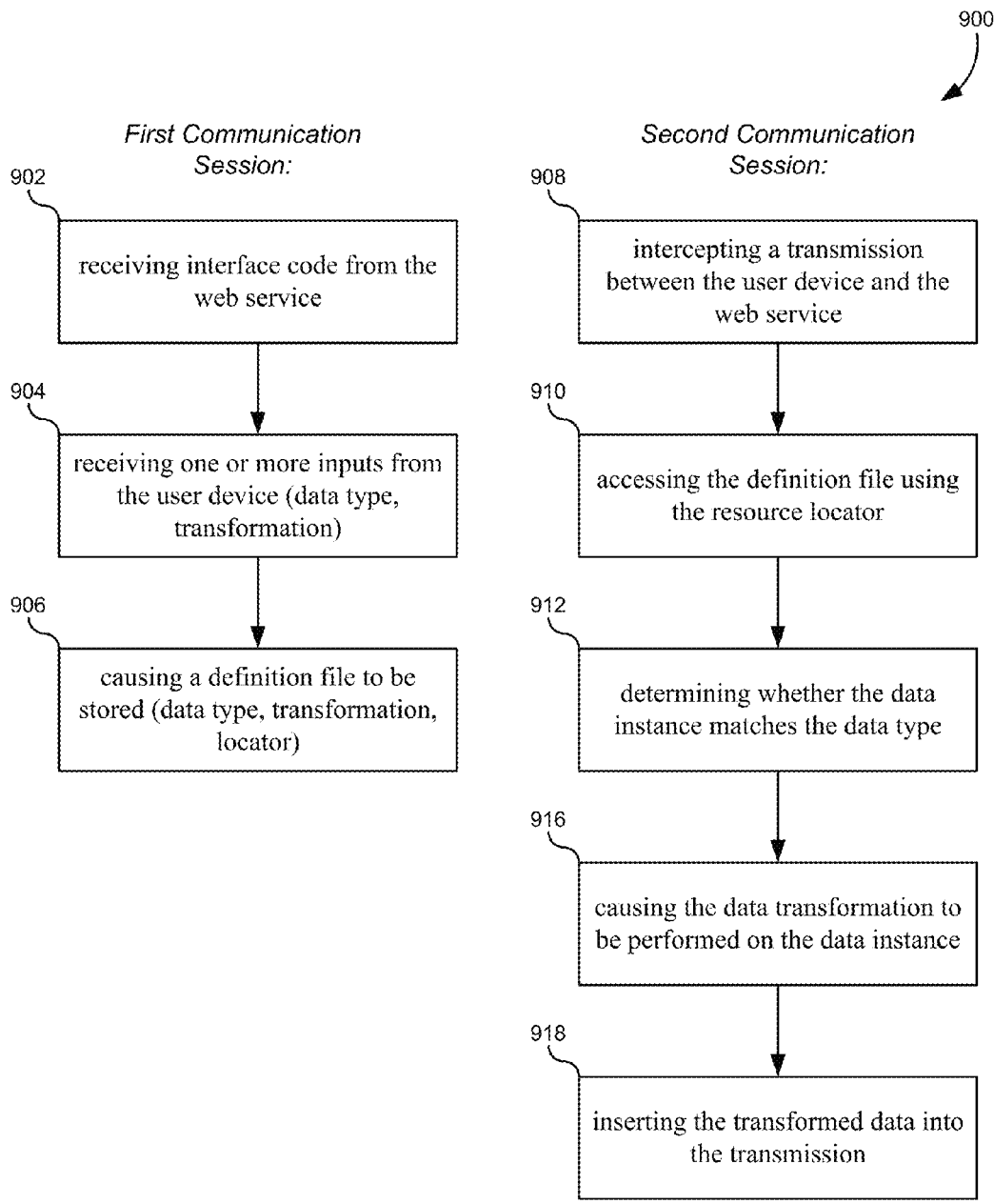
FIG. 9 illustrates a flowchart for performing data transformations on information that is transmitted between a user device and a web service, according to one embodiment.

FIG. 9 illustrates a flowchart 900 for performing data transformations on information that is transmitted between a user device and a web service, according to one embodiment. Whereas the previous flowcharts used specific examples involving URLs, HTTP, XML, and XDF, flowchart 900 generalizes these operations to cover other embodiments. The method may be divided into two distinct communication sessions. The first communication session may be used to create one or more definition files, while the second communication session may be used to perform data transformations on data instances passing between the web service and the user device.

During the first communication session, the method may include receiving interface code from the web service (902). In one embodiment, the interface code may comprise HTTP. The method may also include the method may also include receiving one or more inputs from the user device (904). The inputs may specify one or more data types, and for each data type a transformation to be applied to data instances matching the data type. The one or more data types may be selected from the interface code, which may be displayed on a GUI interface. The method may further include causing a definition file to be stored (906). For example, a proxy may cause the computer system to store a definition file in a memory. The definition file may include at least one data type, along with an indication of the data transformation to be applied to data instances matching the data type. Note that an "indication" of the data transformation may include the actual data transformation code itself, or simply a pointer, file name, or other indicator that would cause the processor to perform transformation code stored elsewhere on the computer system. The definition file may also include a resource locator associated with a web service. The resource locator may be associated with a single data type, or the group of data types, and may be represented by a name of the definition file or a location in which it is stored. In one embodiment, the resource locator may comprise a URL.

During the second communication session, the method may include intercepting a transmission between the user device and the web service (908). The transmission may include many data components such as a data instance and a resource locator. The method may also include accessing the definition file using the resource locator (910). In one embodiment, a URL may be used to find the correct definition file, or the correct location within a definition file to be applied to the transmission. The resource locator may be used to select data type and transformation pairs in one or more definition files to determine which data types should be searched for within the transmission.

The method may additionally include determining whether the data type instance matches the data type (912). In one embodiment, the transmission may be searched for fields, files, or other data types that match the specified data type. For example, all Microsoft Word® documents might be identified, or all text entered into password fields of a web form. In one embodiment, the transmission may include structured data comprised of various fields and identifiers. In other embodiments, the data instance may comprise a data file of unstructured data. In yet another embodiment, data types may include input controls, such as buttons, selectors, and other graphical input constructs.

After identifying data instances that match the data type, the method may further include causing the data transformation to be performed on the data instance (916). It will be understood that multiple transformations may be performed on a single data instance according to the definition file. Finally, the method may include inserting the transformed data into the transmission (918). Thus, the receiving device, be it the user device or the web service, may receive the transformed data instead of the original data in the transmission.

It will be understood that the various operations specifically listed in flowchart 900, along with all other flowcharts described herein, may be altered in various ways. For instance, multiple steps may be combined to form a single step performed by a single software process or hardware module. Likewise, a single step may be divided into multiple sub-steps. Additionally, the order in which operations are listed in the various flowcharts described herein are not meant to indicate a preferred order which they should be executed. The operations depicted in each flowchart may be rearranged or reordered according to the needs of each individual embodiment.

Figure 10:
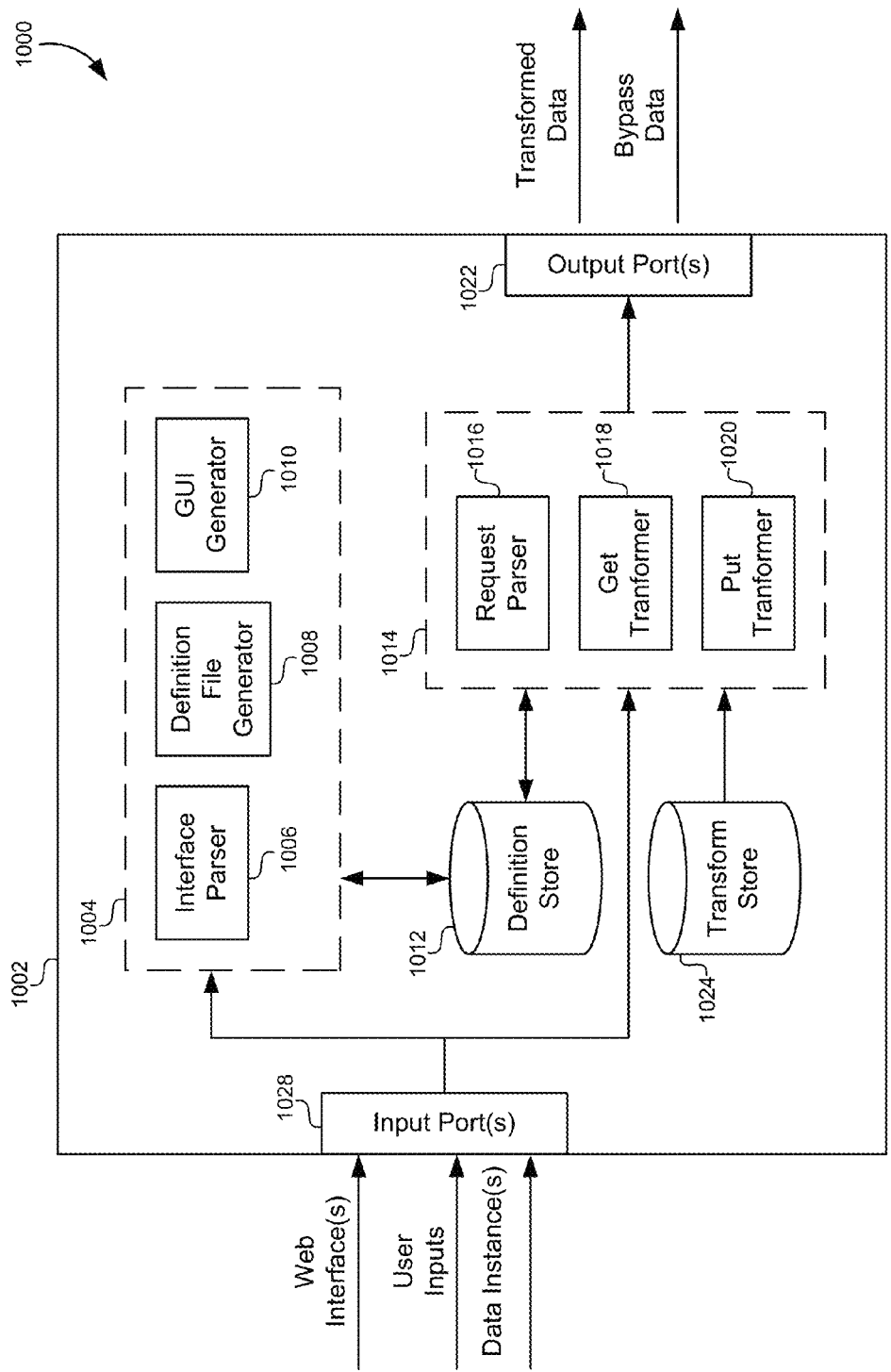
FIG. 10 illustrates a block diagram of a system for performing data transformations on information that is transmitted between a user device and a web service, according to one embodiment.

FIG. 10 illustrates a block diagram 1000 of a system 1002 for performing data transformations on information that is transmitted between a user device and a web service, according to one embodiment. This system may be implemented using any combination of hardware and software. In one embodiment, each module identified in FIG. 10 represents a separate hardware module specifically designed using digital and analog circuits that are well known in the art. In light of this disclosure, one having skill in the art could use well-known digital and analog circuits in order to build a hardware device as specified by FIG. 10.

The system 1002 may include one or more input ports 1028 and one or more output ports 1022. Each of the input ports 1028 and the output ports 1022 may be implemented by single bidirectional ports. The input ports 1028 may receive interface code from web services, user inputs, and data instances as part of transmissions between a user device and a web service. The output ports 1022 may provide either transformed data or bypass data (untransformed data as originally provided to the system 1002).

The input ports 1028 may provide data to a definition generation module 1004 that includes an interface parser 1006 configured to parse the interface code, a GUI generator 1010 configured to display the interface code and receive user inputs, and a definition file generator 1008 configured to generate a definition file using the user inputs. Definition files generated by the definition generation module 1004 may be provided to a definition store 1012. The definition store 1012 may be implemented using any physical memory combined with a database software system. Also included may be a transform store 1024 that is configured to store transformation code. For example, the transformation store 1024 may include processor instructions for executing encryption/decryption algorithms, compression/decompression algorithms, language translation algorithms, and/or the like.

Both the definition store 1012 and the transform store 1024 may provide data to a proxy module 1014 configured to intercept data transmissions between the user device and the web service. The proxy module 1014 may include a request parser 1016 configured to retrieve a definition file from the definition store 1012 and search a transmission for data instances that match the data types stored in the definition file. The proxy module 1014 may also include a GET transformer 1018 and a PUT transformer 1020 that retrieve code from the transform store 1024 and execute the data transformations on the inbound/outbound data to provide transformed data.

In one embodiment, the various modules and systems in FIG. 10 may reside on separate computer systems. Alternatively, multiple modules may be combined on the same or similar computer systems. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of dynamically performing data transformations on information that is transmitted between a user device and a web service, the method comprising:
   during a first communication session:
      receiving interface code from the web service;
      receiving one or more inputs from the user device, wherein the one or more inputs identifies:
         a data type that is associated with the interface code, and
         a data transformation to be applied to data instances matching the data type; and
      causing a definition file to be stored, wherein the definition file comprises:
         the data type,
         an indication of the data transformation, and
         a resource locator that is associated with the web service;
   during a second communication session:
      intercepting a transmission between the user device and the web service, wherein the transmission comprises:
         a data instance, and
         the resource locator;
      accessing the definition file using the resource locator;
      determining that the data instance matches the data type;
      causing the data transformation to be performed on the data instance to generate transformed data based on the determination that the data instance matches the data type; and
      inserting the transformed data into the transmission based on the determination that the data instance matches the data type.

2. The method of claim 1, further comprising:
   during a third communication session:
      intercepting a second transmission between the user device and the web service, wherein the second transmission comprises:
         a second data instance, and
         the resource locator;

accessing the definition file using the resource locator;
determining that the data instance does not match the data type; and
allowing the transmission to pass between the user device and the web service without transforming the data instance based on the determination that the data instance does not match the data type.

3. The method of claim 1, wherein the data transformation comprises encrypting or decrypting the data instance.

4. The method of claim 1, wherein the data transformation comprises compressing or decompressing the data instance.

5. The method of claim 1, wherein the data transformation comprises language translation.

6. The method of claim 1, wherein the data type comprises a field in a structured data set.

7. The method of claim 6, further comprising:
determining that the field should have a format preserved;
generating a placeholder;
inserting the placeholder into the transmission place of the field;
performing the data transformation on the field to generate a transformed field; and
inserting the transformed field into the data stream as an attachment, whereby the attachment is referenced by the placeholder.

8. The method of claim 1, wherein:
the data type indicates segments of unstructured data;
the data instance comprises a data file comprising unstructured data; and
causing the data transformation to be performed on the data instance comprises causing the data file to be transformed.

9. The method of claim 1, wherein the resource locator comprises a Uniform Resource Locator (URL).

10. The method of claim 1, wherein the definition file comprises an XML Definition File (XDF).

11. The method of claim 1, the data type comprises an input control.

12. A non-transitory computer-readable memory having stored thereon a sequence of instructions which, when executed by one or more processors, causes the one or more processors to perform data transformations on information that is transmitted between a user device and a web service by:
during a first communication session:
receiving interface code from the web service;
receiving one or more inputs from the user device, wherein the one or more inputs identifies:
a data type that is associated with the interface code, and
a data transformation to be applied to data instances matching the data type; and
causing a definition file to be stored, wherein the definition file comprises:
the data type,
an indication of the data transformation, and
a resource locator that is associated with the web service;
during a second communication session:
intercepting a transmission between the user device and the web service, wherein the transmission comprises:
a data instance, and
the resource locator;
accessing the definition file using the resource locator;
determining whether the data instance matches the data type;
causing the data transformation to be performed on the data instance to generate transformed data based on the determination that the data instance matches the data type; and
inserting the transformed data into the transmission based on the determination that the data instance matches the data type.

13. The non-transitory computer-readable memory according to claim 12, wherein the instructions further cause the one or more processors to perform data transformations on information that is transmitted between a user device and a web service by:
during a third communication session:
intercepting a second transmission between the user device and the web service, wherein the second transmission comprises:
a second data instance, and
the resource locator;
accessing the definition file using the resource locator;
determining that the data instance does not match the data type; and
allowing the transmission to pass between the user device and the web service without transforming the data instance based on the determination that the data instance does not match the data type.

14. The non-transitory computer-readable memory according to claim 12, wherein the data transformation comprises encrypting or decrypting the data instance.

15. The non-transitory computer-readable memory according to claim 12, wherein the data type comprises a field in a structured data set.

16. The non-transitory computer-readable memory according to claim 12, wherein the instructions further cause the one or more processors to perform data transformations on information that is transmitted between a user device and a web service by:
determining that the field should have a format preserved;
generating a placeholder;
inserting the placeholder into the transmission place of the field;
performing the data transformation on the field to generate a transformed field; and
inserting the transformed field into the data stream as an attachment, whereby the attachment is referenced by the placeholder.

17. A system comprising:
one or more processors; and
a memory communicatively coupled with and readable by the one or more processors and having stored therein a sequence of instructions which, when executed by the one or more processors, cause the one or more processors to perform data transformations on information that is transmitted between a user device and a web service by:
during a first communication session:
receiving interface code from the web service;
receiving one or more inputs from the user device, wherein the one or more inputs identifies:
a data type that is associated with the interface code, and
a data transformation to be applied to data instances matching the data type; and
causing a definition file to be stored, wherein the definition file comprises:
the data type,
an indication of the data transformation, and a resource locator that is associated with the web service;

during a second communication session:
intercepting a transmission between the user device and the web service, wherein the transmission comprises:
a data instance, and
the resource locator;
accessing the definition file using the resource locator;
determining that the data instance matches the data type;
causing the data transformation to be performed on the data instance to generate transformed data based on the determination that the data instance matches the data type; and
inserting the transformed data into the transmission based on the determination that the data instance matches the data type.

18. The system of claim 17 wherein the instructions further cause the one or more processors to perform data transformations on information that is transmitted between a user device and a web service by:

during a third communication session:
intercepting a second transmission between the user device and the web service, wherein the second transmission comprises:
a second data instance, and
the resource locator;
accessing the definition file using the resource locator;
determining that the data instance does not match the data type; and
allowing the transmission to pass between the user device and the web service without transforming the data instance based on the determination that the data instance does not match the data type.

19. The system of claim 17 wherein the data transformation comprises encrypting or decrypting the data instance.

20. The system of claim 17 wherein:
the data type indicates segments of unstructured data;
the data instance comprises a data file comprising unstructured data; and
causing the data transformation to be performed on the data instance comprises causing the data file to be transformed.

* * * * *